United States Patent [19]

Whitney

[11] Patent Number: 5,105,397
[45] Date of Patent: Apr. 14, 1992

[54] CHILD CLOCK APPARATUS

[76] Inventor: Patricia J. Whitney, 10010 Fairmount Rd., Fern Creek, Ky. 40291

[21] Appl. No.: 608,833

[22] Filed: Nov. 5, 1990

[51] Int. Cl.$^5$ .............................................. G04B 19/04
[52] U.S. Cl. ...................................... 368/80; 368/76; 368/228; 368/223; 368/73; 368/250; 368/252
[58] Field of Search ................ 368/76, 78, 80, 223, 368/228, 73, 72, 250, 252

[56] References Cited

U.S. PATENT DOCUMENTS

| | | | |
|---|---|---|---|
| 328,112 | 10/1885 | Dietz | 368/76 |
| 1,851,824 | 3/1932 | Fewell | 368/76 |
| 2,072,795 | 3/1937 | Childs | 368/76 |
| 2,564,270 | 8/1951 | McMillen | 368/76 |
| 3,184,912 | 5/1965 | Freeburg | 368/76 |
| 3,595,010 | 7/1971 | Kaiser | 368/76 |
| 4,601,585 | 7/1980 | Farley | 368/80 |

Primary Examiner—Bernard Roskoski
Attorney, Agent, or Firm—Leon Gilden

[57] ABSTRACT

An apparatus including a clock housing formed of a conventional clockwork to drive an hour and minute hand in a typical fashion relative to the clock face. A series of digits are defined about the clock face for indication of time. An indicator arm mounting an indicator ring at a forward terminal end thereof is pivotal about the clockwork axis and frictionally engageable thereto to selectively indicate a predetermined digit for visual inidication to a child of an impending time frame. A modification of the instant invention includes transparent plates with aluminum members mounted rearwardly thereof selectively actuatable for selective illumination of various digits for indication of a time member digit. Further, the organization selectively includes a farrow magnetic ring mounted in surrounding relationship relative to the clock face for securement of a marker for positioning of the marker relative to an impending time digit.

3 Claims, 6 Drawing Sheets

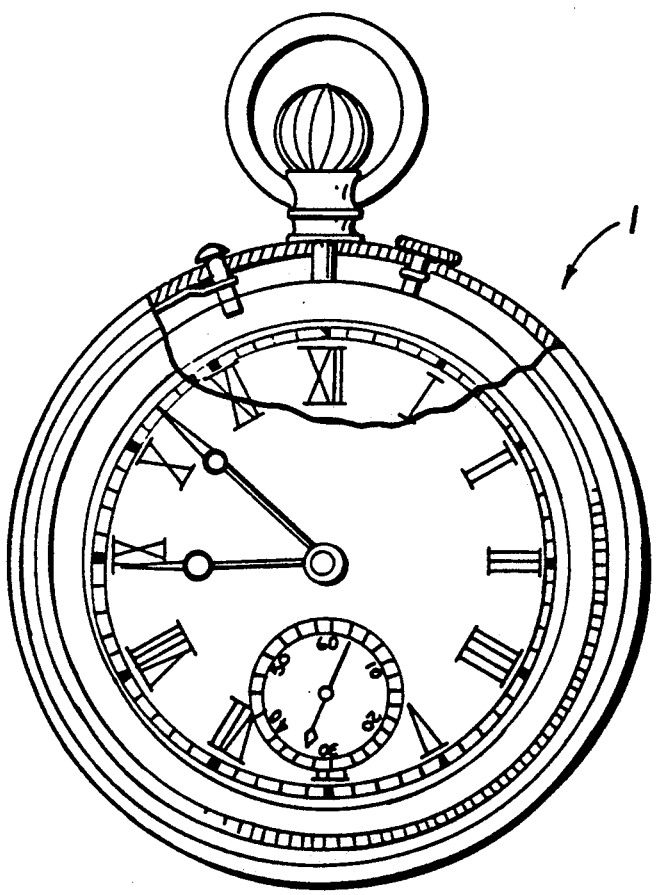
Fig 1
PRIOR ART
Fig 2
PRIOR ART
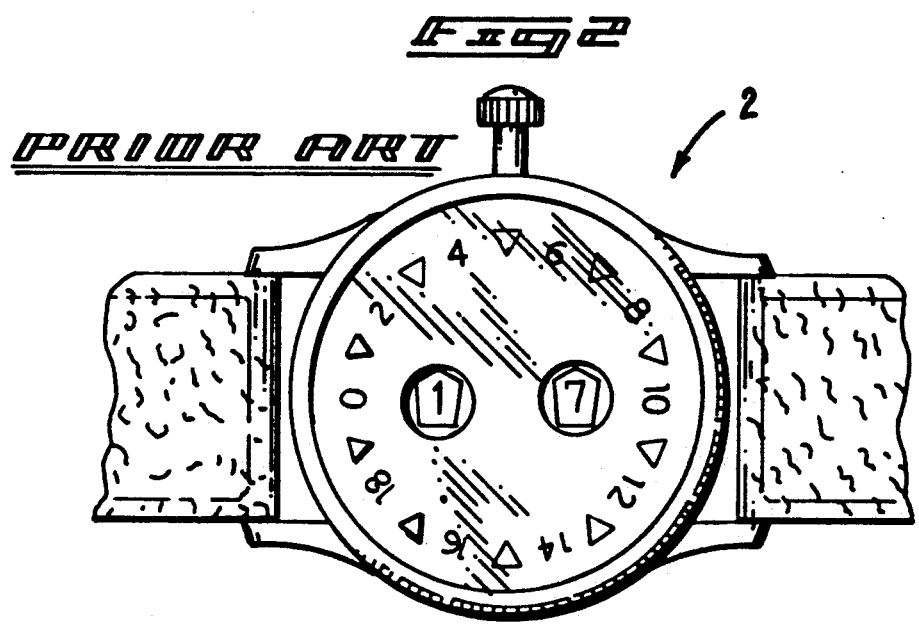

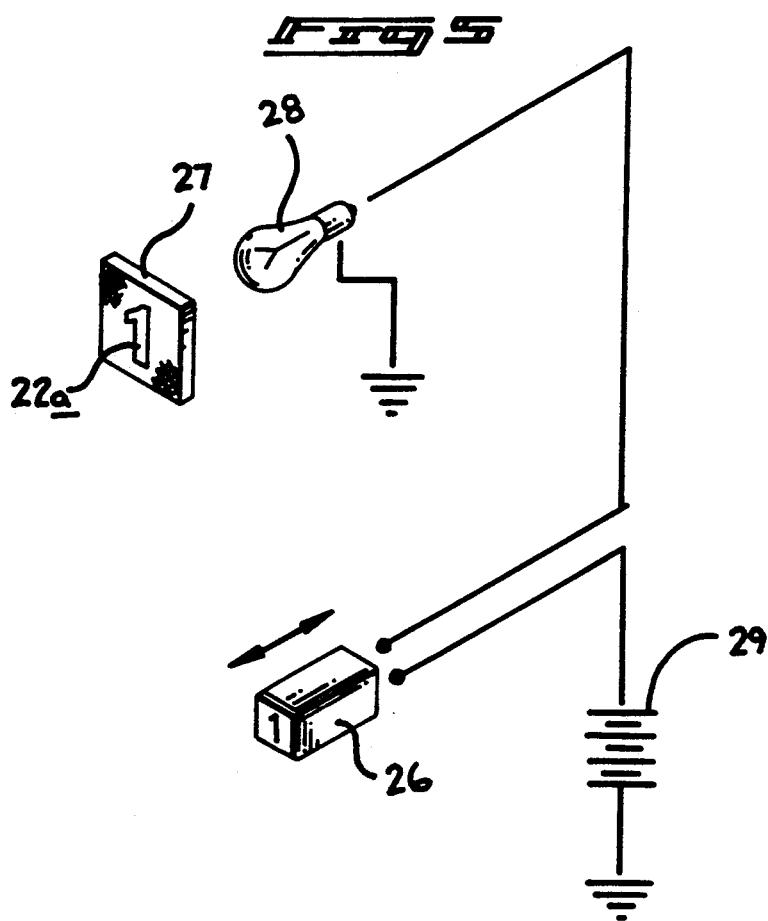
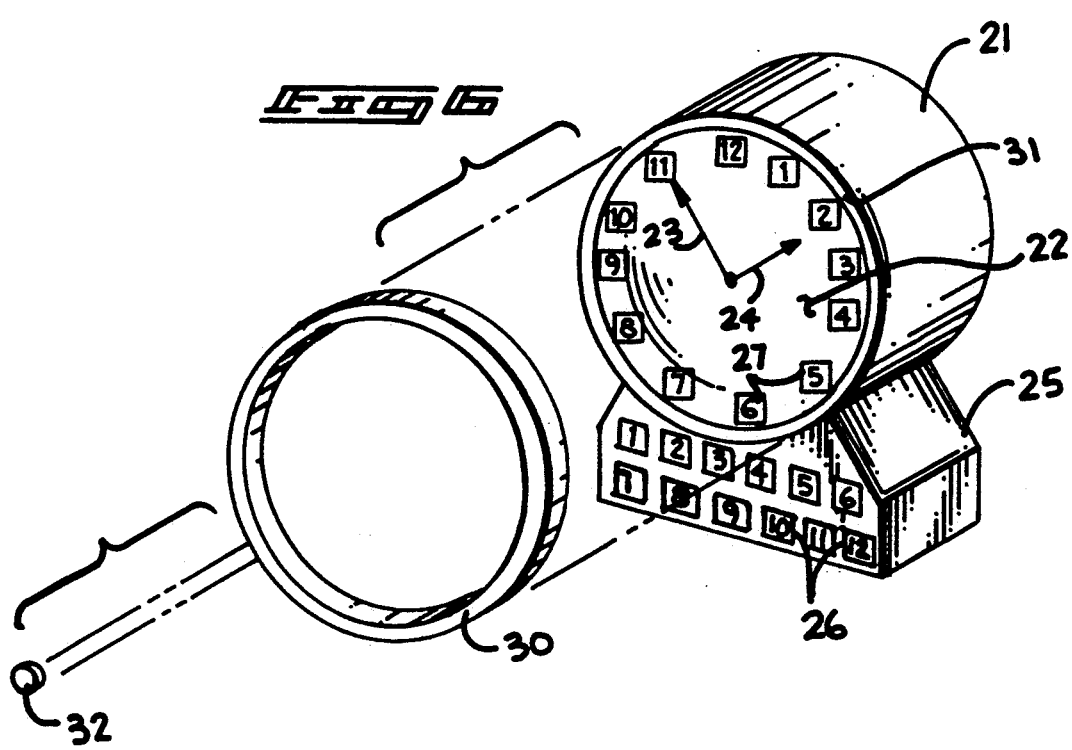

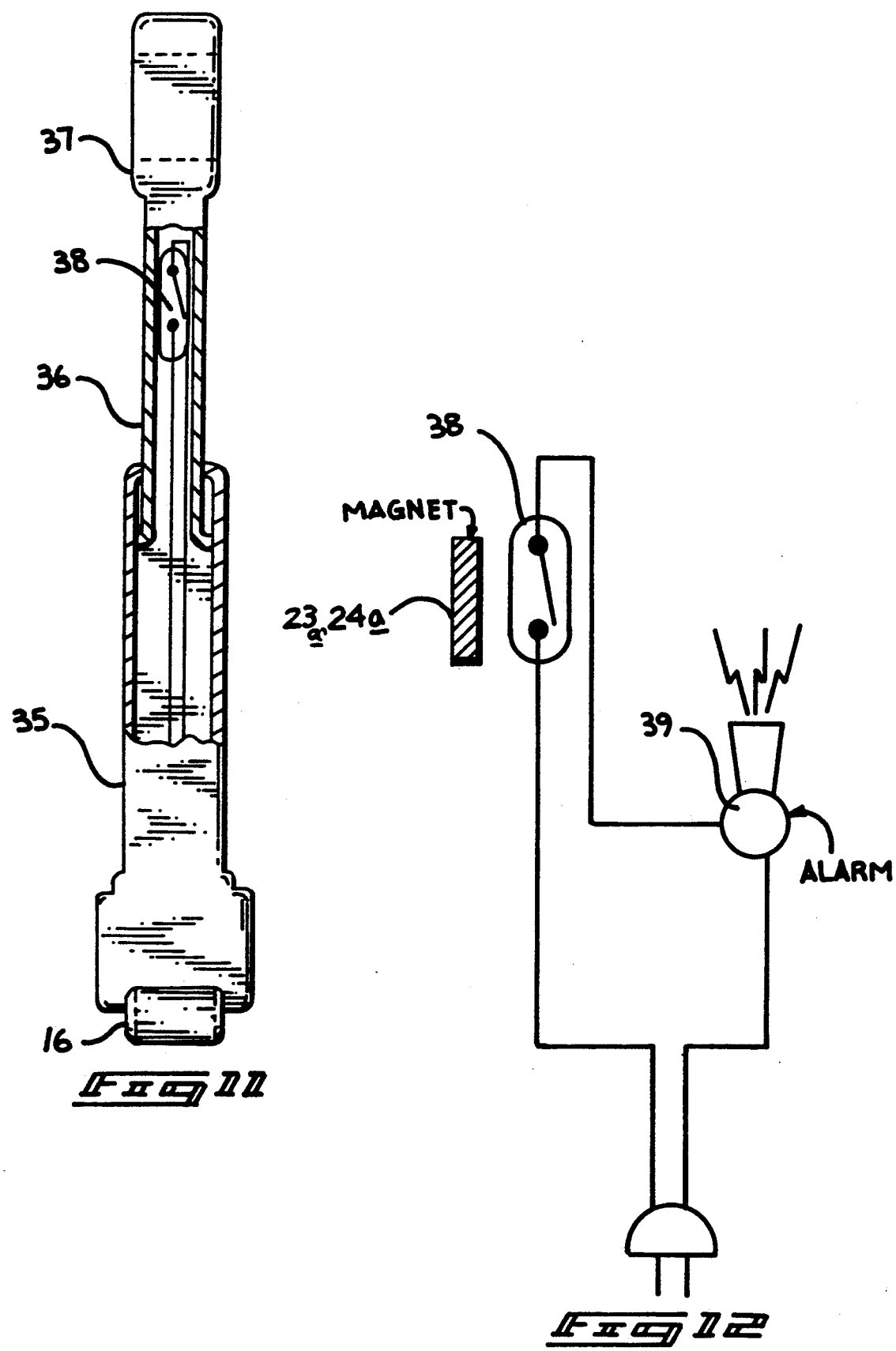

CHILD CLOCK APPARATUS

BACKGROUND OF THE INVENTION

1. Field of the Invention

The field of invention relates to indicator clocks, and more particularly pertains to a new and improved child clock apparatus wherein the same provides visual indication of an associated time digit of an associated clock to present indication of an impending time for observation by children and the like.

2. Description of the Prior Art

Various indicator clock mechanisms have been utilized in the prior art. The prior art utilizes various mechanisms to provide indication of time in a conventional manner. In instruction of children of an impending time, it is frequently necessary to constantly repeat an associated time in response to a child's inquiry. The instant invention attempts to overcome disadvantages of the prior art by providing a conventional clockwork arrangement utilizing an indicator mechanism responsive to an individual totally independent of the clock mechanism to provide visual indication of an impending time. Examples of the prior art include U.S. Pat. No. 315,322 to Nelson setting forth the use of a conventional clockwork timepiece, with ornately configured time indicator hands.

U.S. Pat. No. 3,054,559 to Dom sets forth a watch case in association with a conventional watch, wherein a date is visually provided within windows mounted within the watch face.

U.S. Pat. No. 4,287,583 to Strachan, et al., sets forth a control panel for use with a cooking apparatus utilizing various time and date control dials.

U.S. Pat. No. 1,160,110 to Mays sets forth an elapsed time indicator utilizing conventional indicator hands associated with the organization.

U.S. Pat. No. 3,241,308 to Forney utilizes a flight watch adapter utilizing a housing mounted overlying a conventional watch to permit utilization of the watch to indicate various time sequences in association with flight time associated with air craft control and travel.

As such, it may be appreciated that there continues to be a need for a new and improved child clock apparatus wherein the same addresses both the problems of ease of use as well as effectiveness in construction in permitting visual indication to a child of limited understanding of time and as such, the present invention substantially fulfills this need.

SUMMARY OF THE INVENTION

In view of the foregoing disadvantages inherent in the known types of clock apparatus now present in the prior art, the present invention provides a child clock apparatus wherein the same provides easily manipulated visual indication of a predetermined time and a digit independent of the clock's associated clockwork mechanism. As such, the general purpose of the present invention, which will be described subsequently in greater detail, is to provide a new and improved child clock apparatus which has all the advantages of the prior art clock apparatus and none of the disadvantages.

To attain this, the present invention provides an apparatus including a clock housing formed of a conventional clockwork to drive an hour and minute hand in a typical fashion relative to the clock face. A series of digits are defined about the clock face for indication of time. An indicator arm mounting an indicator ring at a forward terminal end thereof is pivotal about the clockwork axis and frictionally engageable thereto to selectively indicate a predetermined digit for visual indication to a child of an impending time frame. A modification of the instant invention includes transparent plates with aluminum members mounted rearwardly thereof selectively actuatable for selective illumination of various digits for indication of a time member digit. Further, the organization selectively includes a farrow magnetic ring mounted in surrounding relationship relative to the clock face for securement of a marker for positioning of the marker relative to an impending time digit.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child clock apparatus which has all the advantages of the prior art clock apparatus and none of the disadvantages.

It is another object of the present invention to provide a new and improved child clock apparatus which may be easily and efficiently manufactured and marketed.

It is a further object of the present invention to provide a new and improved child clock apparatus which is of a durable and reliable construction.

An even further object of the present invention is to provide a new and improved child clock apparatus which is susceptible of a low cost of manufacture with regard to both materials and labor, and which accordingly is then susceptible of low prices of sale to the consuming public, thereby making such child clock apparatus economically available to the buying public.

Still yet another object of the present invention is to provide a new and improved child clock apparatus which provides in the apparatuses and methods of the prior art some of the advantages thereof, while simultaneously overcoming some of the disadvantages normally associated therewith.

Still another object of the present invention is to provide a new and improved child clock apparatus wherein the same includes a manually manipulatable visual indicator means to selectively indicate individual time digit of an associated clock independently of the clock's timing mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of a prior art clock member.

FIG. 2 is an orthographic top view of a further example of a prior art clock with indicator windows mounted therein.

FIG. 5 is a diagrammatic isometric illustration of the selectively operative illumination means utilized by the instant invention.

FIG. 6 is an isometric illustration, somewhat exploded, illustrating an indicator ring and indicator for selective securement to the associated clock of the instant invention.

FIG. 11 is an orthographic view taken along the lines 11—11 of FIG. 10 in the direction indicated by the arrows.

FIG. 12 is an electrical diagramatic illustration of the alarm circuitry utilized by the instant invention.

DESCRIPTION OF THE PREFERRED EMBODIMENT

Figure 3:
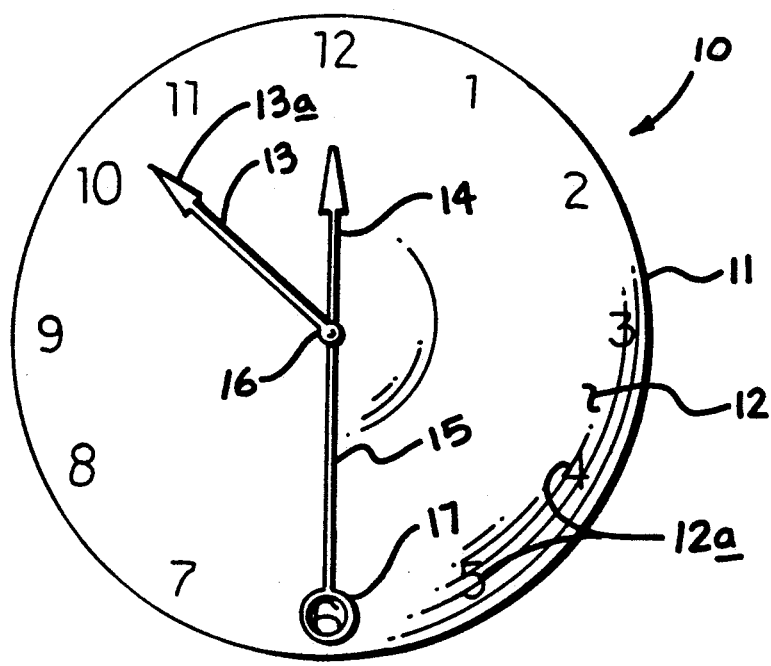
FIG. 3 is an orthographic front view, taken in elevation, of the instant invention.
Figure 4:
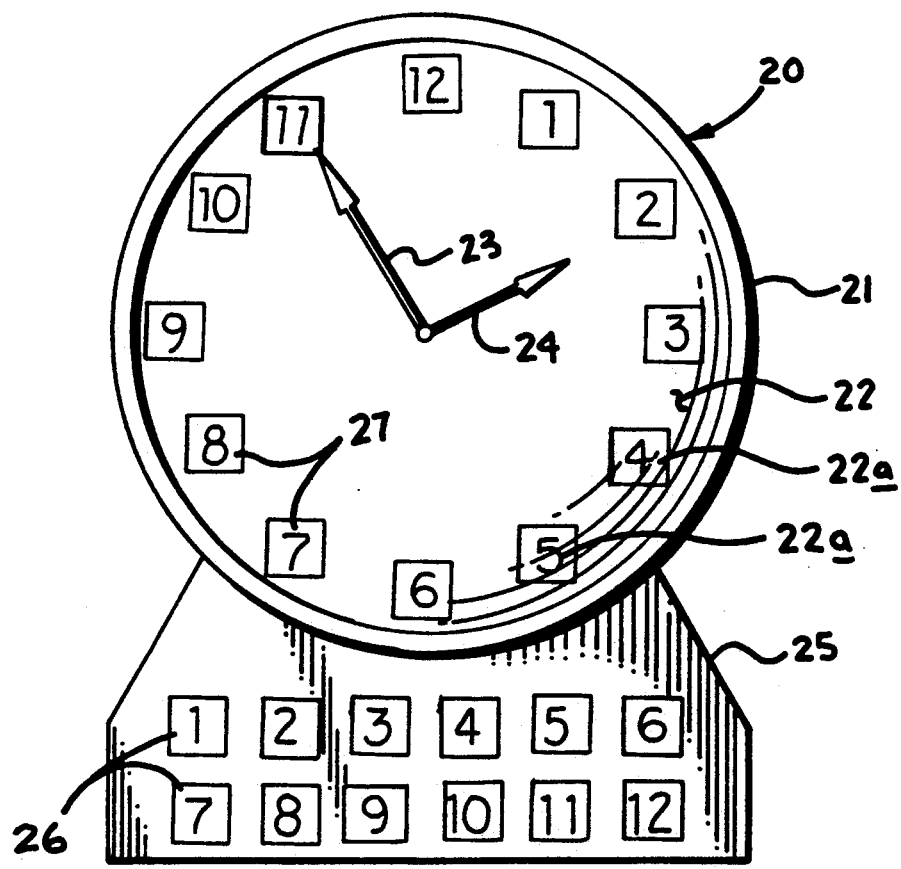
FIG. 4 is an orthographic front view, taken in elevation, of a modification of the instant invention.

With reference now to the drawings, and in particular to FIGS. 1 to 8 thereof, a new and improved child clock apparatus embodying the principles and concepts of the present invention and generally designated by the reference numerals 10 and 20 will be described.

FIG. 1 illustrates a prior art clock mechanism 1 of conventional construction illustrating a clock face utilizing indicator hands of a unique configuration utilizing ornamental rings mounted within the hands. FIG. 2 illustrates a further example of a clock indicator mechanism, wherein indicator windows are mounted within the clock face for indication of a date mechanism associated with the clock.

More specifically, the child clock apparatus 10 of the instant invention essentially comprises a clock housing 11 including a conventional clockwork mechanism mounted therewithin to drive the clock utilizing either conventional mechanical or electrical energy for this purpose. The apparatus further includes a planar clock face 12 formed with an annular array of clock digits 12a mounted thereabout, wherein the clock digits are of conventional enumeration and are defined by a predetermined width. A first indicator hand of a first length is mounted utilizing an indicator pointer 13a located at a forward terminal end thereof, wherein the pointer is also of a predetermined length substantially equal to the predetermined width. A second indicator hand is defined of a second length typically associated with an hour indication, as opposed to the minute indication of the first hand 13. An indicator member 15 is defined by a length substantially equal to the first length and includes a ring indicator 17 mounted at a forward terminal end thereof defined by an internal diameter substantially equal to the predetermined width and the predetermined length, as noted above, to permit encompassing of the indicator pointer 13a and an associated clock digit 12a therewithin to ensure visual understanding of the indicator pointer 13a and the associated indicated digit, as exemplified in FIGS. 3 and 8 for example. The clock axis 16 mounts the indicator member 15 frictionally thereabout, while the first and second indicator hands 13 and 14 respectively are integrally mounted to the clock axis for indication of time in association with the clock in a conventional manner.

A modified child clock apparatus 20 is illustrated in FIGS. 4-8 utilizing an indicator housing 21 and an associated planar clock face 22 formed with indicator digits 22a defined by a predetermined width, with a first and second indicator hand 23 and 24 defined by a respective first and second length, with an indicator pointer 23a mounted at a forward terminal end of the first indicator hand 23 defined by a predetermined length, wherein the predetermined length is substantially equal to the predetermined width in a manner consistent with the invention, as illustrated and discussed per FIG. 3. A lower clock housing 25 is integrally mounted to the housing 21 and includes a series of twelve on/off push button switches 26 mounted therein, wherein each push button switch is enumerated and associated with a respective clock digit 1-12 mounted upon the clock face 22. Reference to FIG. 5 illustrates the use and association of a respective on/off switch 26 to illuminate an associated illumination bulb 28 mounted behind a transparent plate 27. A series of twelve transparent plates 27 are mounted within the clock face and include an associated opaque clock digit 22a formed on the face of each transparent plate 27, as illustrated. Upon depressing and engaging of the switch 26, current from an associated battery or electrical source 29 directs current flow to illuminate the associated bulb 28. In this manner, a respective clock digit 22a is thereby high-lighted by illumination permitting visual understanding of impending time, whereupon a child in viewing the clock face may appreciate that the indicator pointer 23a associated with an illuminated clock digit evidences arrival of a certain time to effect a learning and understanding of the child of time. For example, a child not understanding an impending time twenty minutes hence is merely instructed to observe the arrival of the indicator pointer 23a with the associated illuminated clock digit manually illuminated by an operator to provide a child of such understanding.

Figure 7:
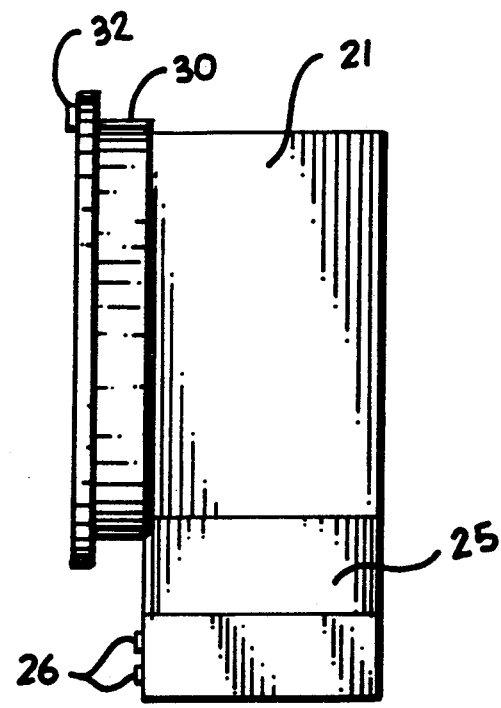
FIG. 7 is an orthographic side view, taken in elevation, of the modified clock of the instant invention.
Figure 8:
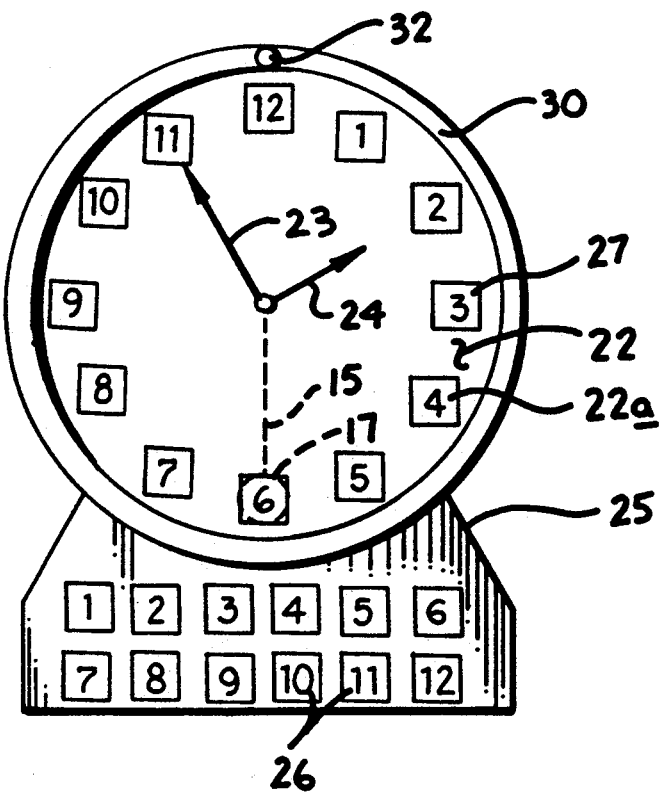
FIG. 8 is an orthographic frontal view, taken in elevation, of the modified clock of the instant invention.

FIGS. 6, 7, and 8 illustrate the instant invention further utilizing a farrow magnetic ring 30 defined by a rearwardly extending rim engageable with a forward annular edge 31 of the clock housing 21. A metallic marker 32 is selectively positionable about a forward planar surface of the ring 30 to mechanically associate the marker 30 with an associated reference time relative to the clock face 22a. Further, the indicator member 15 and associated ring indicator 17 may also be utilized to provide a selective use of various indicators in association with the clock of the instant invention to enhance visual understanding of time by a child in a teaching procedure.

Figure 9:
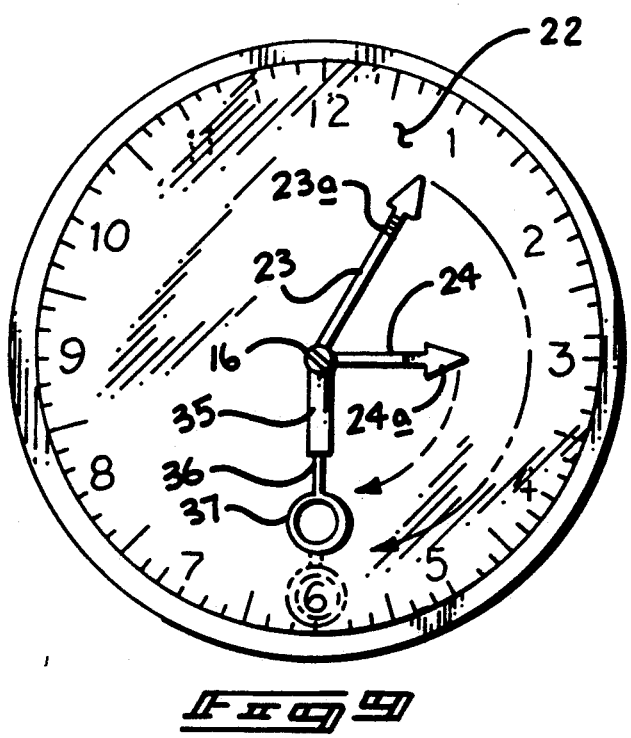
FIG. 9 is an orthographic elevational view of a modified clock face utilized by the instant invention.
Figure 10:
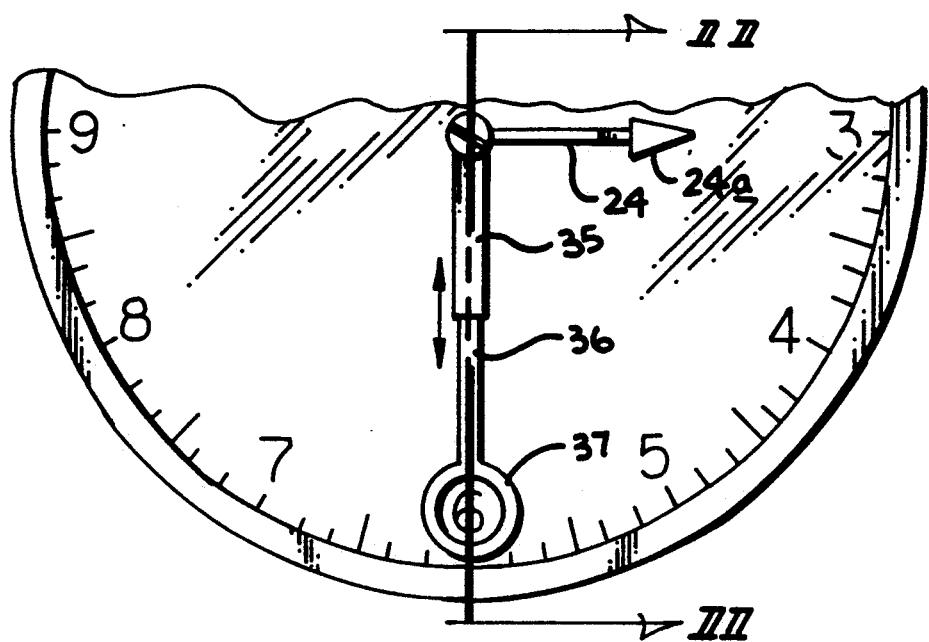
FIG. 10 is an enlarged illustration of the telescoping member on the clock face of FIG. 9.

FIG. 9 illustrates a clock face 22, with the first indicator hand 23 including a first magnetic portion 23a adjacent the forward free end thereof, with the second indicator hand 24 including a second magnetic portion 24a formed to a forward portion of the second indicator hand. A sleeve 35 is pivotally mounted about the access 16 for manual manipulation thereof, with a rod 36 telescopingly received within the sleeve, and a ring 37 mounted to a forward free end of the rod 36. The ring 37 is positionable adjacent to or overlying an associated numbering event within the clock face 22, wherein a magnetic switch 38 is mounted within the rod 38 which is hollow, whereupon overlying positioning of either the first or second hand 23 or 24 effects positioning of either the first or second magnetic portions 23a or 24a over the magnetic switch 38 to effect actuation thereof and subsequent actuation of an audible indicator 39 or selectively, an illumination member such as a bulb to indicate proper alignment of either the first or second indicator hand relative to the ring 37 to further enhance association of the hourly or minute hand by a child in the learning procedure relative to a certain digital reference of time of the clock face 22.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An indicator clock apparatus comprising, a clock housing, and a planar clock face mounted orthogonally relative to the housing, wherein the clock face includes an annular array of sequentially enumerated clock digits, each clock digit defined by a predetermined width, and the clock face including a clock axis, the clock axis including a first indicator hand defined by a first length, wherein the first indicator hand includes an indicator pointer defined by a predetermined length mounted at a forward terminal end of the first indicator hand, and a second indicator hand mounted to the clock axis, wherein the first and second indicator hands are in operative association with a clockwork mounted within the clock housing for indication of time, and indicator means in operative association with the clock digits for selectively indicating a single clock digit relative to remaining clock digits, and wherein the indicator means includes an elongate longitudinally aligned indicator member, the indicator member defined by a first length substantially equal to a first indicator hand, and the indicator member including a ring indicator fixedly mounted at a forward terminal end of the indicator member, the indicator ring including an internal diameter substantially equal to or greater than the predetermined width of each clock digit, and wherein the housing includes a further housing, the further housing integrally mounted to and underlying the housing and including a series of on/off push button switches defined by a predetermined number equal to a predetermined number defined by the clock digits, and each clock digit mounted on a transparent plate, each transparent plate mounted within the clock face, and an illumination member mounted rearwardly of each transparent plate selectively illuminated in cooperation with a respective on/off switch and, wherein the clock face includes a sleeve pivotally mounted to the clock axis, the clock including a rod extensibly and telescopically mounted within the sleeve, with the rod including a ring mounted at a forward end thereof, the rod including a magnetic switch mounted therewithin, the magnetic switch electrically associated with an alarm, and the first indicator hand includes a first magnetic portion, and the second indicator hand includes a second magnetic portion, wherein the overlying positioning of the first or the second magnetic portions relative to the magnetic switch effects actuation of the alarm.

2. An apparatus as set forth in claim 1 further including a magnetic housing ring, the housing ring including a rearwardly directed skirt, the skirt fixedly securable in surrounding relationship relative to the clock face, and a metallic marker selectively securable to the magnetic ring adjacent a selective clock digit for selective indication of a clock digit relative to remaining clock digits.

3. An apparatus as set forth in claim 2 wherein the clock digits are defined by twelve clock digits and the on/off switches are defined by twelve on/off switches with a single respective one on/off switch cooperative with a respective clock digit.

* * * * *